(12) United States Patent
Whiteside et al.

(10) Patent No.: US 8,428,385 B2
(45) Date of Patent: Apr. 23, 2013

(54) NON-UNIFORMITY ERROR CORRECTION WITH A BILATERAL FILTER

(75) Inventors: Randel S. Whiteside, Tigard, OR (US); Cynthia I. Archer, Sherwood, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 918 days.

(21) Appl. No.: 12/491,165

(22) Filed: Jun. 24, 2009

(65) Prior Publication Data

US 2010/0329583 A1 Dec. 30, 2010

(51) Int. Cl.
*G06K 9/40* (2006.01)

(52) U.S. Cl.
USPC .......................................... 382/260; 382/275

(58) Field of Classification Search .................. 382/254, 382/255, 274, 275, 260; 356/446
See application file for complete search history.

(56) References Cited

U.S. PATENT DOCUMENTS

| | | | |
|---|---|---|---|
| 3,756,721 A | 9/1973 | Williams | |
| 4,675,532 A | 6/1987 | Carson | |
| 5,077,816 A | 12/1991 | Glomb et al. | |
| 5,514,865 A | 5/1996 | O'Neil | |
| 5,582,171 A | 12/1996 | Chornenky et al. | |
| 5,601,087 A | 2/1997 | Gunderson et al. | |
| 5,602,820 A | 2/1997 | Wickramasinghe et al. | |
| 5,615,192 A | 3/1997 | Kikukawa et al. | |
| 5,715,265 A | 2/1998 | Epworth | |
| 5,717,208 A | 2/1998 | Woolaway, II | |
| 5,721,427 A | 2/1998 | White et al. | |
| 5,764,053 A | 6/1998 | Robbins et al. | |
| 5,838,813 A | 11/1998 | Kancler et al. | |
| 5,859,893 A | 1/1999 | Moorman et al. | |
| 5,905,571 A | 5/1999 | Butler et al. | |
| 5,925,875 A | 7/1999 | Frey | |
| 5,925,880 A | 7/1999 | Young et al. | |
| 5,939,704 A | 8/1999 | Perrie et al. | |
| 6,184,527 B1 | 2/2001 | Young | |
| 6,211,515 B1 | 4/2001 | Chen et al. | |
| 6,222,861 B1 | 4/2001 | Kuo et al. | |
| 6,243,498 B1 | 6/2001 | Chen et al. | |
| 6,263,002 B1 | 7/2001 | Hsu et al. | |
| 6,330,371 B1 | 12/2001 | Chen et al. | |
| 6,507,018 B2 | 1/2003 | Young | |
| 6,515,285 B1 | 2/2003 | Marshall et al. | |
| 6,901,173 B2 | 5/2005 | Alderson et al. | |

(Continued)

FOREIGN PATENT DOCUMENTS

WO    2007106018 A1    9/2007

OTHER PUBLICATIONS

Copenheaver, Blaine R., Authorized officer, International Searching Authority, International Search Report, International Application No. PCT/US2010/039852; search completion date: Aug. 5, 2010; mailing date: Sep. 1, 2010.

(Continued)

*Primary Examiner* — John Strege
(74) *Attorney, Agent, or Firm* — Kolisch Hartwell, P.C.

(57) ABSTRACT

Correction of spatial nonuniformities among detectors in a focal plane array. Incoming image data is incident on the array, and the resulting image signals are corrected with a bilateral filter. The bilateral filter accounts for edge effects by filtering based both on spatial separation between image points and photometric separation between image points.

26 Claims, 3 Drawing Sheets

U.S. PATENT DOCUMENTS

| | | |
|---|---|---|
| 2002/0186309 A1 | 12/2002 | Keshet et al. |
| 2007/0003155 A1 | 1/2007 | Miller et al. |
| 2008/0158679 A1 | 7/2008 | Luty et al. |
| 2008/0170800 A1 | 7/2008 | Bergman et al. |
| 2008/0267530 A1 | 10/2008 | Lim |
| 2009/0161111 A1* | 6/2009 | Ossman et al. ............... 356/446 |

OTHER PUBLICATIONS

Copenheaver, Blaine R., Authorized officer, International Searching Authority, Written Opinion of the International Searching Authority, International Application No. PCT/US2010/039852; opinion completion date: Aug. 5, 2010; mailing date: Sep. 1, 2010.

* cited by examiner

NON-UNIFORMITY ERROR CORRECTION WITH A BILATERAL FILTER

BACKGROUND

Focal plane arrays are used to digitally capture electromagnetic radiation, and are common components of digital imaging systems. A focal plane array comprises an array of individual detectors, generally photodiodes, which produce current when exposed to photons of sufficient energy. This current, later converted to a voltage, may be treated in a variety of ways to generate an image that is displayed to the end user.

Individual detectors in focal plane arrays are subject to non-uniformity errors. Specifically, if two detectors at a uniform temperature are exposed to the same scene information, their response voltages may differ. Non-uniformity errors are described in terms of offset (the difference in response to a calibrated input from the expected response) and gain (the difference in slope of the line between two responses to two calibrated inputs from the expected slope). These errors increase the minimum detectable signal, decrease the signal-to-noise ratio, and thus have a detrimental effect on system performance. The effect is particularly severe for high performance, high sensitivity detector arrays.

Various solutions to the problem of detector non-uniformity error have been developed. These solutions generally involve exposing the detector array to calibrated electromagnetic radiation. Under the assumption that all detectors should exhibit equal signals when exposed to an equal intensity of radiation, response deviations from the nominal signals are used to obtain offset and gain correction maps, which are then applied to detected signals before displaying the image data.

Perhaps the simplest way of obtaining correction maps is the two-point correction method, in which uniform radiation at two different precisely known temperatures is applied to the array and the response of each detector is measured. The offset and gain response of each detector is then calculated by approximating the response as a line through these two calibration points. For a given detector, the extrapolation of the line through any particular temperature gives the offset response of the detector, and the gain is just the slope of the response line.

Because the detectors are assumed to be linear devices, correcting detector gain and offset at one set of exposure intensity levels is assumed to allow correction at all other levels. However, detectors often do not respond linearly, resulting in errors even after correction by the two-point method. In one enhancement of the two-point method, detector response is measured at various temperatures to experimentally obtain offset and gain corrections for each detector over the range of expected operating temperatures. Because detector response typically changes non-linearly with temperature, measuring at various temperatures is commonly more accurate than the two-point correction method.

Commonly, focal plane array detectors are tested under controlled conditions after manufacture, for example using the two-point correction method, to derive an offset table and/or a gain table. Such tables might include, for example, the gain of each detector and the offset of the detector at one particular temperature, allowing the offset to be calculated at any other temperature for each detector in an array. These tables are fixed after testing and used to correct for each detector's unique non-uniformity error. However, because non-uniformity errors may be nonlinear and may vary over time and under different operating conditions, correction using data solely from calibration shortly after manufacture is error-prone. Thus, manufacturers have developed non-uniformity error correction methods that can be performed in the field.

For example, one proposal involves application of known electromagnetic radiation signals using shutters, mirrors, or the like to achieve a two-point calibration during operation. As in the two-point correction method performed described above, correction values are calculated for each detector in the array based on the assumption that all detectors should exhibit equal signals when exposed to an equal intensity of radiation. Because the in-field method may be performed repeatedly during operation, rather than once following manufacture, non-uniformity errors that evolve over time or in response to operating conditions may be corrected.

One specific in-field calibration approach has been to periodically place a mechanical paddle, designed to act as a uniform radiation source, in front of the detector array such that an image of the ideally uniform paddle surface is captured. Because the paddle is assumed to be uniform, deviations in individual detectors are treated as errors, from which a revised offset table may be derived. However, this particular approach has several drawbacks. First, scene acquisition must be interrupted, which is undesirable where continuously obtaining scene information is required or preferred. Second, because the paddle is treated as an ideal surface, actual non-uniformities in the reflectivity of the paddle will mistakenly be assumed to be detector non-uniformity error and "burned in" to the offset table. Furthermore, paddle systems correct detector response at only one electromagnetic frequency at a time, making it difficult or impossible to correct for errors that vary as a function of radiation wavelength or intensity.

Another general approach to non-uniformity error correction in focal plane arrays has been to image substantially identical scene information on a plurality of detectors within the array. By comparing the resultant output from a plurality of detectors exposed to substantially identical scene information, detector non-uniformity errors, which remain spatially fixed, may be identified and corrected. In this general method, scene information is translated across the focal plane array either passively, by comparing subsequent frames of a moving set of objects, or actively, by introducing mechanical motion such as dithering in the imaging system. Under either method, because scene information has been translated across the array, multiple detectors are assumed to have seen substantially identical scene information in subsequent frames. Thus, any differences between reported values are assumed to be due to detector non-uniformity errors, and may be used to derive the offset and gain correction tables.

For example, U.S. Pat. No. 6,507,018 describes a passive method of non-uniformity correction. In the passive method described by U.S. Pat. No. 6,507,018, a determination is first made whether sufficient relative motion exists between the scene and focal plane array. If so, the difference in temporal frequency between the high-frequency moving scene information and the low-frequency stationary detector non-uniformity errors may permit the two signals to be decoupled. Then, a spatial low pass filter algorithm is used to perform corrections to the high-temporal-frequency moving scene information. The algorithm estimates each detector's offset and gain value by comparing each detector's response to a local response average among neighboring detectors that are exposed to substantially identical scene information. This method may be performed iteratively, to update the offset and gain tables in response to changing conditions. However, one limitation to this method is that sufficient scene motion is required to separate scene information from detector nonuniformity error. To address this limitation, intentional motion such as mechanical dithering may be introduced.

An example of a prior art nonuniformity correction method involving mechanical dithering is described in U.S. Pat. No. 5,925,880. In the described method, periodic mechanical motion is introduced to the imaging system such that under the assumption of a slowly changing scene, multiple detectors are exposed to substantially identical scene information. As in the passive method, neighborhood averaging is used to determine the ideal output for each detector, and thus to derive updated gain and offset correction update tables. This method, however, suffers from several drawbacks. First, because the algorithm assumes a precise magnitude of scene translation across the detector, the method is very sensitive to dither translation accuracy. Second, any detector with a response substantially different from the ideal value will skew the average detector response of those detectors in its neighborhood. Furthermore, because the method assumes a slowly changing scene, performance can suffer during rapid scene movement. This potential decline in performance may be overcome to some extent by increasing the dithering frequency, but such an increase may come at the expense of dithering accuracy and mechanical reliability. Therefore, the mechanical dithering method is not particularly suitable for applications with rapid scene motion, such as moving platform applications.

Another nonuniformity correction method using mechanical dithering is described in U.S. Pat. No. 5,925,875. The described method entails passing the dithered image through a temporal high pass filter. Because dithering introduces known periodic motion to scene information, the high pass filter passes high temporal frequency scene information while removing low temporal frequency non-uniformity error. The image is then restored either by time-delay-integration (TDI) or by spatial inversion. In TDI, detectors imaging similar scene information in consecutive frames are matched, and their signals are time-averaged over several frames, from which the image may be restored. In spatial inversion, effects of dithering and filtering are reduced using precise knowledge of the dither pattern and high pass filter response, such that an image signal is constructed from the filtered signal.

Both of the methods disclosed in U.S. Pat. No. 5,925,875 suffer from several weaknesses. The temporal high pass filter algorithm requires storage and real-time access of several full image frames simultaneously. Because of the storage limitations of embedded memory technology, the application of this method to higher resolution images is limited. Second, the high pass filter will pass all high temporal frequency information, whether induced by dithering or by imaging platform motion. Deconvolution of these two sources of motion introduces severe complications in a moving platform application. Under the TDI technique, where detectors measuring similar scene information in consecutive frames are matched, the platform motion must be measured and compensated for in the detector matching process. Platform motion may be measured either with mechanical devices or additional image processing, but at a penalty of size, cost, and complexity. Under the spatial inversion technique, where the image signal is constructed using precise knowledge of the dither pattern and filter response to remove image distortion, the algorithm will need to take platform motion into account. As in the TDI case, precise knowledge of platform motion will be needed, at the penalty of size, cost, and complexity.

In light of the foregoing, there is a need for a relatively simple and robust method to provide non-uniformity error correction of detectors in a focal plane array, particularly in a high resolution imaging system and in a moving platform application.

SUMMARY

The present teachings disclose methods and apparatus for correction of spatial non-uniformities among detectors in a focal plane array. Incoming image data is incident on the array, and the resulting image signals are corrected with a bilateral filter. The bilateral filter accounts for edge effects by filtering based both on spatial separation between image points and photometric separation between image points.

Definitions

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation. Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light. Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation. Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared, particularly portions in the far or thermal IR having wavelengths between about 0.1 and 1 mm, may alternatively, or in addition, be termed millimeter-wave (MMV) wavelengths.

DETAILED DESCRIPTION

This disclosure describes a system and method for correcting focal plane array non-uniformity errors using a bilateral filter. The term "bilateral filter" is used in this disclosure to mean an image smoothing filter that simultaneously considers location similarity and attribute similarity between pixels, where a "pixel" refers to the portion of a displayed image corresponding to one detector in a detector array. For example, a bilateral filter may be defined using a combination of spatial separation and photometric separation. More specifically, a bilateral filter according to the present teachings may be defined using the product of a first weight factor that depends on spatial separation between pixels and a second weight factor that depends on photometric separation between pixels. Thus, the weight afforded to a particular pixel by the filter depends on both its spatial distance and its photometric similarity to the pixel upon which the filter is operating. To more precisely define the bilateral filters disclosed herein, the following terminology will be used:

S represents the spatial domain, consisting of the set of all possible positions in an image;

$\vec{p}, \vec{q}$ are vectors representing 2-dimensional positions (x,y) in an image;

I represents an unfiltered image intensity, and $\tilde{I}$ represents an image intensity to which a bilateral filter has been applied;

$f(\|\vec{p}-\vec{q}\|)$ represents a function of the difference in spatial positions of points in an image; and $M(\vec{p})$ represents a general photometric property (such as intensity or color) of point $\vec{p}$ in an image, and $g(M(\vec{p})-M(\vec{q}))$ represents a function of the difference in values of this property.

Using this terminology, a bilateral filter according to the present teachings may be generally represented by the following equation:

$$\tilde{I}(\vec{p}) = \frac{1}{W_{\vec{p}}} \sum_{\vec{q} \in S} f(\|\vec{p}-\vec{q}\|) g(M(\vec{p})-M(\vec{q})) I(\vec{q}), \quad (1)$$

where the denominator is a normalization factor defined by:

$$W_{\vec{p}} = \sum_{\vec{q} \in S} f(\|\vec{p}-\vec{q}\|) g(M(\vec{p})-M(\vec{q})). \quad (2)$$

In Eq. 1, the function $f(\|\vec{p}-\vec{q}\|)$ is a weight factor that depends on the spatial separation between point $\vec{q}$ and point $\vec{p}$ of the image, and $g(M(\vec{p})-M(\vec{q}))$ is a weight factor that depends on the photometric separation, i.e., the difference in photometric property M, between point $\vec{q}$ and point $\vec{p}$ of the image. Photometric separation between image points may be a function of a difference in intensity or color (R, G and/or B) between the points. However, any photometric variable by which it may be advantageous to define a bilateral filter may be used as the photometric property M. Furthermore, the bilateral filter may operate to correct errors in properties other than the intensity I of the image signal. For instance, the bilateral filter may operate to correct errors in color, in which case I and $\tilde{I}$ in Eq. 1 would be replaced by suitable vector quantities representing unfiltered and filtered color components.

The weight factors $f(\|\vec{p}-\vec{q}\|)$ and $g(M(\vec{p})-M(\vec{q}))$ can generally take any functional form that assigns a decreasing weight to more distant and more dissimilar pixels in an image, and the precise weight functions chosen may be selected based on a particular imaging application. Suitable weight functions may include, for example, decreasing polynomials of various degrees, and any of the numerous well-known distribution functions that assign decreasing weight to points further from a central value. One particular type of weight function that may be suitable is a Gaussian function, generally defined by $$G_\sigma(x) = \frac{1}{\sigma\sqrt{2\pi}} \exp\left(-\frac{x^2}{2\sigma^2}\right), \quad (3)$$

where $\sigma$ is a parameter defining the width of the Gaussian, i.e., the extent of the neighborhood effectively considered by the weight function. For example, a bilateral filter may be defined by the product of a first Gaussian function of spatial separation characterized by a first width parameter $\sigma_f$, and a second Gaussian function of photometric separation characterized by a second width parameter $\sigma_M$. Furthermore, the photometric property M may be defined, for example, as intensity I such that the second weight factor is a Gaussian function of intensity difference. Substituting Gaussian distributions of the form of Eq. 3 into Eq. 1, and using the intensity I as the photometric property M, a suitable bilateral filter according to the present teachings is described by the equation:

$$\tilde{I}(\vec{p}) = \frac{\sum_{\vec{q} \in S} \exp(-\|\vec{p}-\vec{q}\|^2 / 2\sigma_f^2) \exp(-(I(\vec{p})-I(\vec{q}))^2 / 2\sigma_M^2) I(\vec{q})}{\sum_{\vec{q} \in S} \exp(-\|\vec{p}-\vec{q}\|^2 / 2\sigma_f^2) \exp(-(I(\vec{p})-I(\vec{q}))^2 / 2\sigma_M^2)}. \quad (4)$$

In Eq. $\sigma_f$ and $\sigma_M$ are independent width parameters, allowing any desired relative importance to be given to the spatial and photometric distance between pixels when applying the bilateral filter.

By defining a bilateral filter using both a function of spatial distance $f(\|\vec{p}-\vec{q}\|)$ between pixels and a function of photometric difference $g(M(\vec{p})-M(\vec{q}))$ between pixels, the bilateral filter smoothes images while also taking into account photometric variation, and thus preserves edges better than a conventional smoothing filter. More specifically, in regions of nearly uniform intensity with image noise consisting mainly of temporal noise, photometric values of neighboring pixels are similar to each other such that the photometric distribution function approaches unity, and the filter operates as a conventional smoothing filter. However, at an intensity edge, where $\vec{p}$ lies on the high intensity side, the photometric function assigns high values for neighbors on the high intensity side and low values for neighbors on the low intensity side. In this case, the bilateral filter essentially considers only those pixels with similar intensity to $\vec{p}$, and $\tilde{I}(\vec{p})$ becomes a weighted average of neighbors on the high intensity side. Thus, noise is reduced while edge features are substantially preserved.

By simultaneously considering spatial and photometric information, a bilateral filter can effectively filter high spatial frequency data with relatively less blurring than a conventional filter. For example, a bilateral filter may be used to effectively remove row and column noise, which has high spatial frequency, from an image containing other high spatial frequency data. Because row and column noise will typically have significant intensity dissimilarity among near neighbors beyond the affected row or column, the bilateral filter may smooth this noise while preserving other high spatial frequency data. Additionally, a bilateral filter can reduce temporal noise in relatively smooth areas, as a conventional spatial filter would. In contrast, a conventional spatial Gaussian filter averages each pixel's properties among all near neighbors regardless of photometric differences, such that isolated noise is smoothed into the background but high spatial frequency information is blurred. In such cases, a Gaussian filter would blur row and column noise into the image.

I. System Overview

Figure 1:
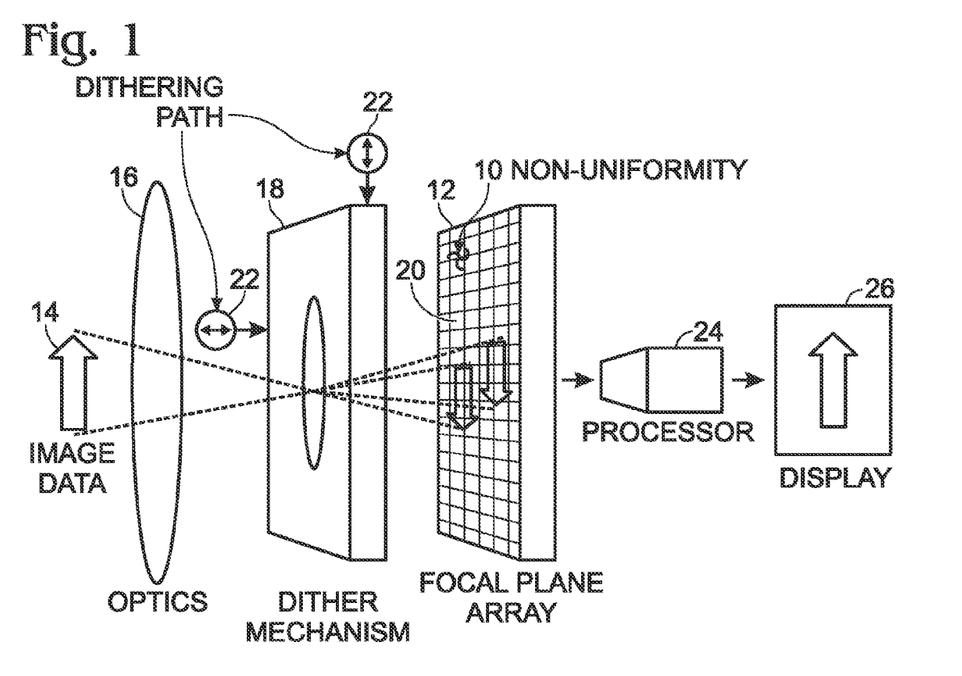
FIG. 1 is a schematic diagram showing elements of an image correction system for correcting focal plane non-uniformity errors, according to aspects of the present disclosure.

FIG. 1 shows a system, according to aspects of the present disclosure, for correcting fixed position non-uniformities, one of which is generally indicated at 10, in a focal plane array 12 observing a scene. Incoming image data 14 encounters one or more optical elements, generally depicted at 16, and may also encounter a dithering mechanism 18, before arriving at a focal plane array 12. Optical elements 16 may include, for example, one or more lenses, mirrors, apertures or the like configured to receive, direct and/or focus incoming image data, and to pass the image data toward the focal plane array. Focal plane array 12 generally includes a plurality of detectors 20, disposed substantially within a substantially planar array.

Detectors 20 may be any devices configured to receive image data, generally in the form of electromagnetic radiation, and to produce an image signal corresponding to a pixel in the acquired image in response. For example, each detector 20 may be capable of producing an image signal in response to visible, near-infrared, or infrared radiation. However, methods according to the present disclosure are suitable for use with detectors sensitive to any wavelength regime of electromagnetic radiation.

Concurrent with the acquisition of scene information, a dithering mechanism 18 may be configured to spatially translate incoming image data 14. If utilized, dithering mechanism 18 moves with a dithering path 22, which spatially translates image data 14 in a known manner relative to focal plane array 12. Such translation may occur, for example, with fixed frequency and sub-pixel resolution, although any known dithering path, whether fixed or variable, may be suitable.

When systems according to the present disclosure include a dithering mechanism 18, dithering need not occur at particularly high frequencies even when the system is mounted to a moving platform or used to image rapidly moving objects. For instance, in one embodiment, dithering mechanism 18 is configured to spatially translate incoming image data with a frequency of less than one cycle per second. This is in contrast to some prior art systems, which as described previously require a relatively high frequency dithering when scene information changes rapidly.

In systems including a dithering mechanism 18, the dithering motion changes the position over time of image data 14 relative to each detector 20 in the focal plane array. The effect of the dithering motion is to translate image data 14 across focal plane array 12 in a known path, thus decoupling scene information from fixed non-uniformity errors in focal plane array 12. Decoupling permits a more accurate determination of detector non-uniformity errors, which can thus be corrected in subsequent frames (as described in detail below with respect to FIG. 5). Therefore, scene information may be more accurately rendered in the resultant image. Aside from a dithering mechanism, other methods may be used to decouple scene information from non-uniformity errors. For example, a motion detector or estimator may be used to determine scene motion, as will be described in more detail below.

A processor 24 may be configured to receive image signals produced by detectors 20 of focal plane array 12, apply a non-uniformity correction algorithm, including a bilateral filter, to the received signals to at least partially correct the image signals for non-uniformity errors among the detectors 20, and produce corrected image data. In systems including dithering mechanism 18, processor 24 may be further configured to remove translation effects of dithering mechanism 18 from the signals and to iteratively update detector offset correction data based on non-uniformity errors removed by the bilateral filter (as described in detail below with respect to FIG. 5). Also as described in more detail below, the processor may be configured to operate as a motion sensor or detector, which updates detector offset correction data only when sufficient scene motion is detected.

In some embodiments according to the present teachings, processor 24 is configured to apply a bilateral filter defined using a combination of spatial separation and photometric separation between pixels. For example, processor 24 may be configured where the photometric separation between pixels is a function of a difference in intensity between the pixels. Alternatively, processor 24 may be configured where the photometric separation between pixels is a function of a difference in color between the pixels. However, processor 24 may be configured using any photometric attribute by which it may be advantageous to define a bilateral filter.

In some embodiments according to the present teachings, processor 24 is configured to apply a bilateral filter defined using the product of a first weight factor that depends on spatial separation between pixels and a second weight factor that depends on photometric separation between the pixels. Thus, the weight of a particular pixel (i.e., its effect on the application of the filter to a pixel upon which the filter is operating) would depend on both its spatial distance and its photometric similarity to the pixel upon which the filter is operating.

For example, processor 24 may be configured to apply a bilateral filter defined such that the first weight factor is a Gaussian function of spatial separation characterized by a first width parameter, and the second weight factor is a Gaussian function of photometric separation characterized by a second width parameter. Furthermore, the photometric property may be defined, for example, as intensity such that the second weight factor is a Gaussian function of intensity difference. However, processor 24 may be configured to apply a bilateral filter defined using weight factors that generally take any functional form that assigns a decreasing weight to more distant and more dissimilar pixels in an image, and the precise weight functions chosen may be selected based on a particular imaging application.

In some embodiments according to the present teachings, processor 24 is configured to apply a threshold bilateral filter. A threshold changes the neighborhood of pixels considered by the bilateral filter and thus may be used to improve non-uniformity correction results and enhance system performance. In a threshold bilateral filter, processor 24 is configured such that the bilateral filter considers only those pixels meeting a predetermined criterion in its calculations. Thus, only pixels with parameter values below a certain threshold with respect to some parameter are considered by the bilateral filter, while pixels above the threshold are ignored. In other words, the threshold represents a maximum or minimum spatial or photometric difference that the filter will consider when calculating a correction for each pixel. Thus, the threshold may improve bilateral filter performance by reducing the number of pixels considered to those most likely to be relevant to the correction of a particular pixel.

A threshold filter may consider only those pixels with parameter values either above or below a threshold, depending on the parameter selected and the application. The predetermined criterion may, for example, be defined as photometric dissimilarity $g(M(\vec{p})-M(\vec{q}))$ below a certain value, such that only those image points with photometric dissimilarity below a certain value are considered by the bilateral filter. More specifically, photometric dissimilarity may be defined as intensity difference $(I(\vec{p})-I(\vec{q}))$ between pixels, so that the bilateral filter only considers pixels below a defined intensity difference. In some cases, this may improve the correction of non-uniformity detector errors while leaving naturally occurring intensity differences unchanged. Alternatively, the threshold may be defined by any other function that reflects the likelihood of a particular detector or group of detectors within a focal plane array to exhibit non-uniformity errors at a particular time.

In some embodiments according to the present teachings, processor 24 is configured to apply an adaptable threshold bilateral filter, where the threshold value of photometric dissimilarity is adaptable to changing imaging conditions. Processor 24 may be configured to change the threshold in response to changes in image noise, contrast, non-uniformity, or any other parameter that may affect bilateral filter performance. For example, with a non-uniformity-based adaptable threshold, as residual non-uniformity increases, the threshold may change (adapt) so that more pixels are considered by the filter. Conversely, as residual non-uniformity decreases, the threshold may change in the opposite direction, so that fewer pixels are considered.

Figure 2:
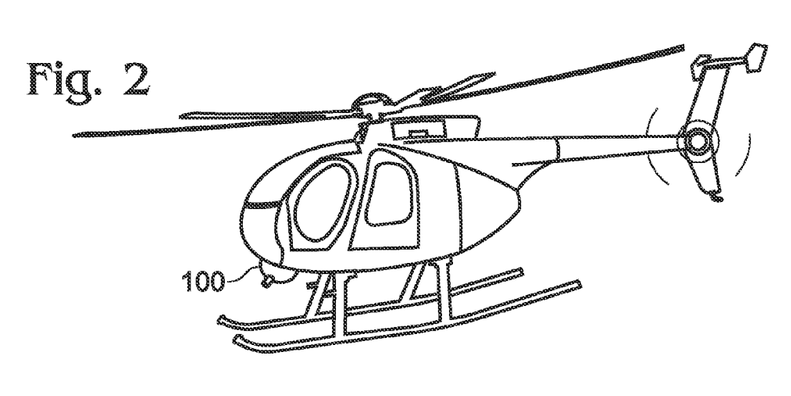
FIG. 2 depicts an airborne moving platform suitable for use with the apparatus depicted in FIG. 1 and methods depicted in FIGS. 3-5.

Because the degree of non-uniformity error may change rapidly during imaging, for example in a moving platform application, a threshold that adapts to changing imaging conditions may be advantageous. For example, FIG. 2 illustrates an imaging system 100 mounted to a helicopter, which is a common application where an adaptable threshold bilateral filter may be particularly suitable. However, any moving platform application is likely to benefit from implementation of an adaptable threshold bilateral filter, and that the filter also may be advantageous for viewing rapidly changing scene information from a stationary platform.

Following correction of non-uniformity errors by processor 24, the corrected image data may be directed to a real-time display 26, recorded for subsequent use and/or analysis, or both.

II. Correction of Non-uniformity Errors With A Bilateral Filter

Figure 3:
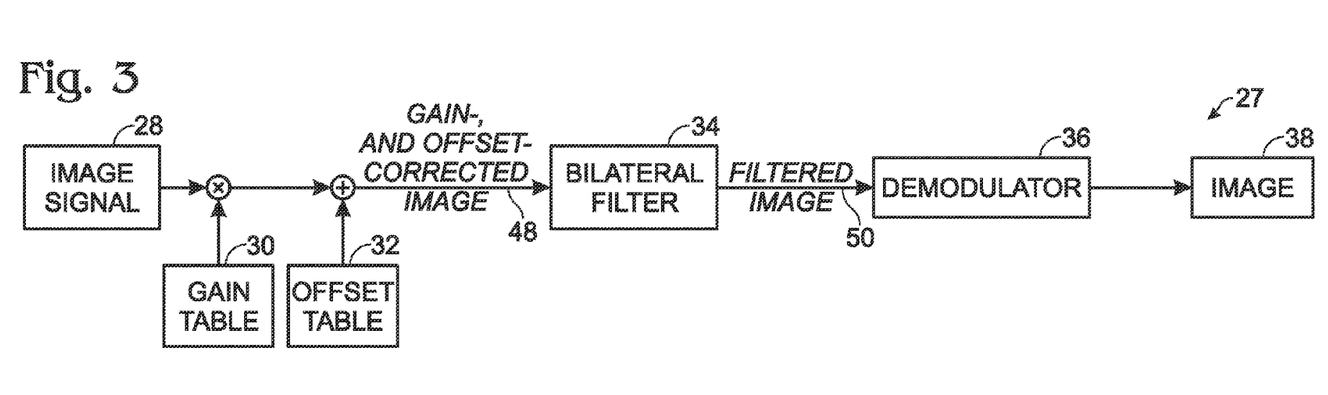
FIG. 3 is a flowchart depicting a method of correcting focal plane non-uniformity errors, according to aspects of the present disclosure.

FIG. 3 depicts a method, generally indicated at 27, for correcting focal plane array non-uniformity errors using a bilateral filter, according to aspects of the present disclosure. In method 27, image data is received at a substantially planar array of detectors, and image signal 28 is produced by the array of detectors in response to the received image data. Image signal 28 produced by the detectors may be partially corrected by means of a gain correction table 30 to produce an approximately gain-corrected image signal. As described previously, gain is a measure of the response gradient of each detector 20. Accordingly, gain correction table 30 provides for at least partial correction of response gradient non-uniformities between detectors 20. In one embodiment, gain correction table 30 will be determined for the focal plane array 12 at the time of its manufacture. However, any suitable means may be used to determine response gradients for focal plane array 12 such that an approximate gain correction table may be determined.

According to method 27, the gain-corrected image signal may be further partially corrected by means of offset correction table 32 to produce an approximately gain- and offset-corrected image signal 48. Initial offset correction approximately corrects for the differential response of each detector 20 to a fixed input signal, typically a "dark" signal corresponding to zero or near-zero input, although an offset correction corresponding to any fixed input may be used. In one embodiment, the offset correction table 32 will be determined for the focal plane array at time of manufacture. In another embodiment, described further below and depicted in FIG. 5, offset correction table 32 is calculated from residual fixed position noise filtered from approximately gain- and offset-corrected image signals. However, any suitable means may be used to determine detector response differences for focal plane array 12 such that an approximate offset correction table may be determined.

According to the present teachings, bilateral filter 34 is applied to image signal 28 produced by the detectors, which may be approximately gain- and offset-corrected, to at least partially correct for non-uniformity errors among the detectors 20. As mentioned earlier, bilateral filter 34 may be defined using a combination of spatial separation and photometric separation, such as a difference in intensity between pixels. Furthermore, bilateral filter 34 may be defined using the product of a first weight factor that depends on spatial separation between pixels and a second weight factor that depends on photometric separation between the pixels. In some embodiments according to the present teachings, the first weight factor is a Gaussian function of spatial separation characterized by a first width parameter, and the second weight factor being a Gaussian function of photometric separation characterized by a second width parameter. In some cases, the photometric property may be defined, for example, as intensity such that the second weight factor is a Gaussian function of intensity difference. However, bilateral filter 34 may be configured using any photometric property and weight functions, depending on the details of a particular imaging application.

In systems equipped with dithering mechanism 18, filtered image 50 may be shifted by a demodulator 36, to remove translation effects of dithering (as described in detail below with respect to FIG. 5) before displaying image 38 to the user.

III. Adaptable Threshold Bilateral Filter

Figure 4:
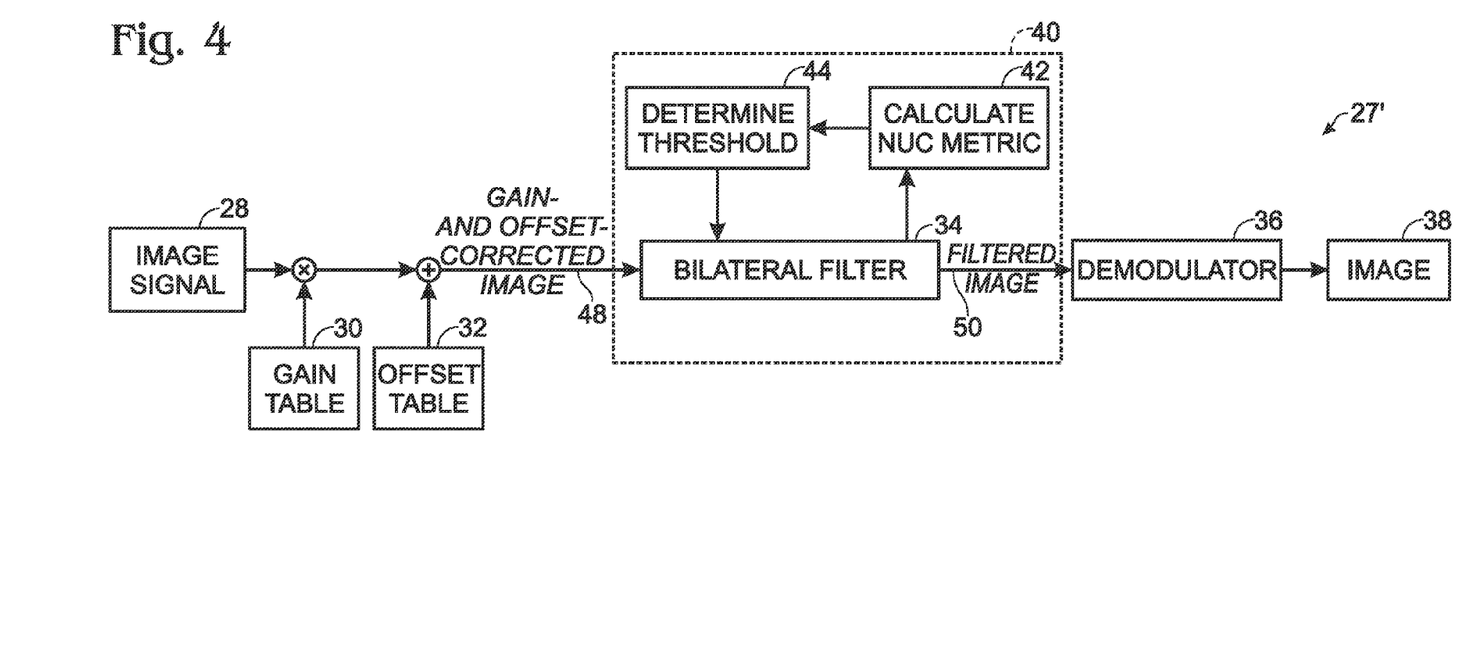
FIG. 4 is a flowchart depicting another method of correcting focal plane non-uniformity errors, according to aspects of the present disclosure.

FIG. 4 illustrates a method 27' of non-uniformity correction which is similar to method 27 of FIG. 3, except that method 27' of FIG. 4 includes the use of an adaptable threshold bilateral filter 40. In method 27', bilateral filter 34 considers only those pixels meeting a predetermined criterion, as defined by threshold 44, in its calculations. Generally, threshold 44 represents a maximum spatial or photometric difference that the filter will consider when calculating a correction for a particular image point. Thus, only pixels with parameter values below a certain threshold 44 are considered by the adaptable threshold bilateral filter, while pixels above the threshold are ignored. Alternatively, the filter may be applied to pixels with parameter values above (rather than below) a threshold, depending on the parameter selected and the application.

Threshold 44 may be defined, for example, where the predetermined criterion is photometric dissimilarity $g(M(\vec{p})-M(\vec{q}))$ such that only pixels with photometric dissimilarity below a certain value are considered by bilateral filter 34. Alternatively, threshold 44 may be defined by any other function that reflects the likelihood of a particular detector or group of detectors within a focal plane array to exhibit non-uniformity errors at a particular time. Furthermore, in some embodiments according to the present teachings, threshold 44 may change, such that the threshold value of photometric dissimilarity is adaptable to changing imaging conditions. With an adaptable threshold, as residual non-uniformity increases, threshold 44 adapts and more scene information is filtered.

As FIG. 4 depicts, adaptable threshold bilateral filter 40 typically operates by iteratively calculating a non-uniformity correction metric ("NUC metric") 42 and adjusting threshold 44 in response to changes in the NUC metric. As threshold 44 adjusts, the neighborhood of pixels considered by bilateral filter 34 grows or shrinks, ideally to those pixels most likely to be relevant to the correction of a particular image point. The NUC metric may be calculated using any parameter that is expected to change in response to iterative non-uniformity error correction by the system. For example, in one embodiment where detector column noise is the primary source of detector non-uniformity error, the intensity difference between affected columns and scene information in neighboring columns may be used to calculate the NUC metric. As such column noise is reduced by adaptable threshold bilateral filter 40, the intensity difference between affected columns and scene information in neighboring columns will decrease, and the NUC metric will correspondingly decrease. In other embodiments according to the present teachings, the NUC metric may be calculated based on image noise, contrast, non-uniformity, or any other parameter that may affect bilateral filter performance.

As depicted in FIG. 4, threshold 44 may then be updated in response to changes in the NUC metric. Typically, threshold 44 is updated such that, as the NUC metric decreases, threshold 44 decreases and the neighborhood of pixels considered by bilateral filter 34 decreases. Likewise, as the NUC metric increases, threshold 44 increases and the neighborhood considered by bilateral filter 34 increases. These adjustments may be performed by means of an algorithm that calculates an appropriate threshold 44 from each NUC metric value. For example, in one embodiment where detector column noise is the primary source of detector non-uniformity error, the NUC metric may be defined as the maximum intensity difference between adjacent image points within a row that traverses the affected column. Then, threshold 44 may be defined directly as the magnitude of intensity difference, such that no pixels will be considered by bilateral filter 34 with an intensity difference $(I(\vec{p})-I(\vec{q}))$ greater than this value. This allows detector column non-uniformity noise to be corrected without unnecessarily blurring high-contrast portions of the actual image, such as the image edges. However, threshold 44 may be calculated from the NUC metric using any algorithm that is responsive to changes in non-uniformity error, depending on the details of a particular imaging application.

Considering the neighborhood of pixels as defined by threshold 44, bilateral filter 34 then operates to remove non-uniformity noise from each image point, as described above. In systems equipped with dithering mechanism 18, filtered image 50 again may be shifted by a demodulator 36, to remove translation effects of dithering (as described in detail below with respect to FIG. 5) before displaying image 38 to the user.

IV. Iterative Offset Correction Table Update Flow

Figure 5:
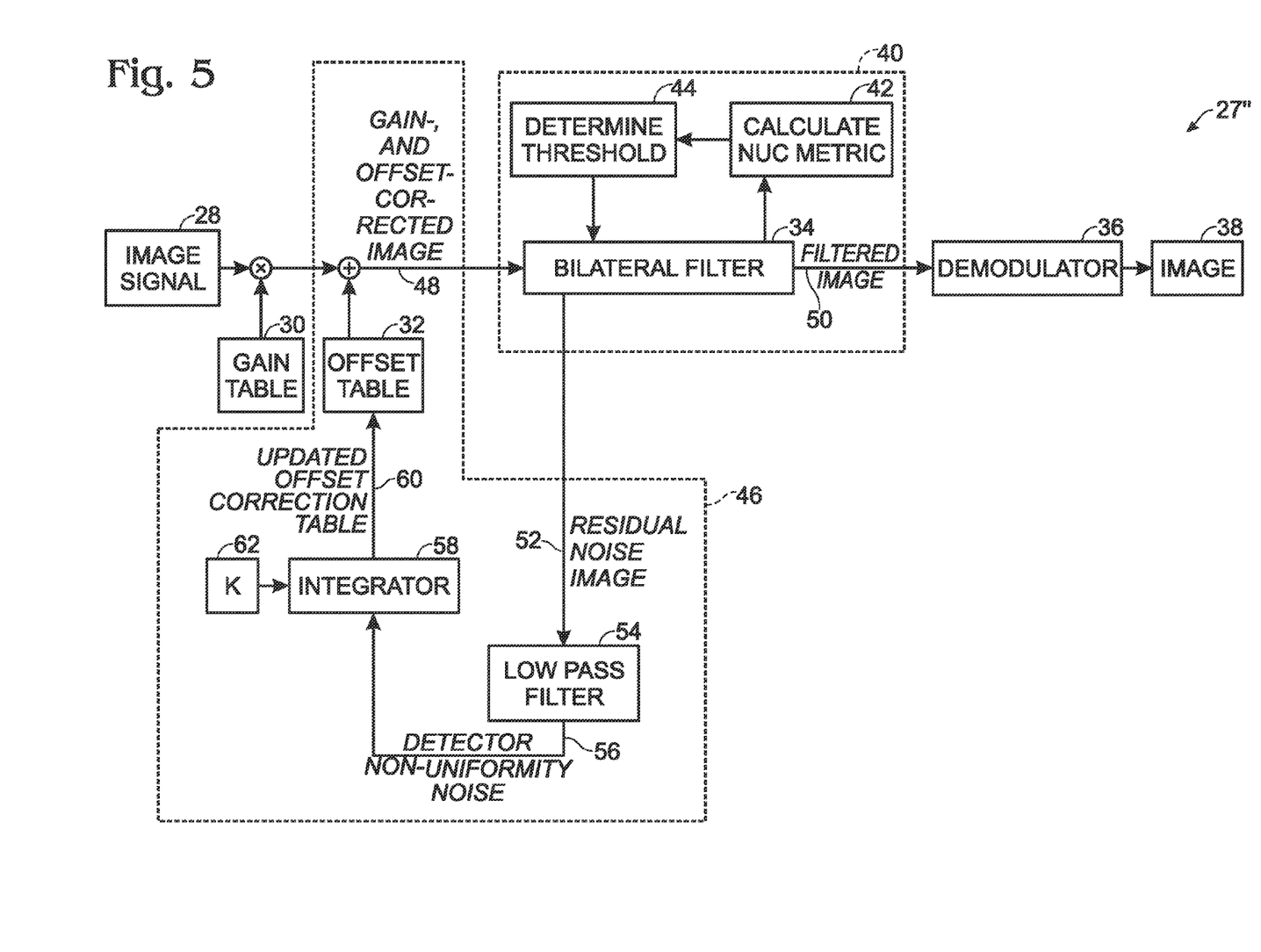
FIG. 5 is a flowchart depicting another method of correcting focal plane non-uniformity errors, according to aspects of the present disclosure.

FIG. 5 illustrates a method 27" of non-uniformity correction which is similar to method 27' of FIG. 4, except that method 27" of FIG. 5 also includes a flow to iteratively update detector offset correction data based on non-uniformity errors corrected by the bilateral filter, generally indicated at 46. In method 27", mechanical dithering may be used to obtain non-uniformity error data from noise removed by bilateral filter 34. Detector offset correction table 32 is then iteratively updated based on this data. A similar scheme may be used to update gain correction table 30, although this may not be necessary when offset table 32 is updated frequently and/or at input levels corresponding to the actual imaging temperature of each detector.

Alternatively or in addition to a dithering mechanism, a motion detector or estimator may be used to determine when the offset and/or gain correction tables are to be updated. In this case, a reference image frame is first saved by the processor. As each subsequent image frame is captured, a determination is made as to whether scene motion has occurred relative to the reference frame. Motion detection can include an actual determination of the amount of scene motion, or motion may be detected without measuring the amount of motion. Detecting motion without calculating the precise amount of motion may be less computationally intensive than measuring the amount of the motion.

For example, a simple motion detector may project each frame of a captured image frame onto two vectors: a horizontal "profile" vector and a vertical "profile" vector. Correlation between the profile vectors of the reference frame and the captured frame then gives a rough estimate of scene motion. If there is sufficient motion detected, noise image 52 may be sent to iterative flow 46, including (temporal) low pass filter 54 and integrator 58. If there is insufficient motion detected, no offset and/or gain map update may be performed. When a motion estimator is used, the reference image is also generally periodically updated. This can be done on a fixed schedule (e.g., every 200 frames) or when sufficient motion of a captured frame relative to the previous reference frame has been measured.

Because bilateral filter 34 removes noise from gain- and offset-corrected image 48, subtracting filtered image 50 from gain- and offset-corrected image 48 yields residual noise image 52. Residual noise image 52 commonly includes detector non-uniformity noise, residual scene information, and temporal noise. Dithering mechanism 18 and/or scene motion spatially translates image data and associated temporal noise, but not detector non-uniformity noise, relative to focal plane array 12. Thus, residual scene information and associated temporal noise in residual noise image 52 are spatially translated along dithering path 22 and/or along the path of the scene motion, while detector non-uniformity noise remains relatively fixed. Therefore, low pass filter 54 may be used to obtain the relatively low frequency detector non-uniformity noise 56 from the residual noise image 52, while filtering out the relatively higher frequency residual scene information and associated temporal noise. Because detector non-uniformity noise is relatively fixed, neither dithering nor scene motion need occur at particularly high frequency for low pass filter 54 to remove residual scene information and associated temporal noise from residual noise image 52. For example, in some embodiments according to the present teachings, spatial translation due to dithering may occur with frequency less than one cycle per second.

In method 27" of FIG. 5, detector non-uniformity noise 56 is used to update offset correction table 32 by means of integrator 58. Integrator 58 calculates the inverse of detector non-uniformity noise image 56, which corresponds to the degree of non-uniformity error in the image. Integrator 58 then uses the inverse of detector non-uniformity noise image 56 to update offset correction table 32. Various algorithms may be used by integrator 58 to produce updated offset correction table 60, which replaces the prior offset correction table 32 in the system. For example, the inverse noise image may simply replace the previous values in the offset table. Alternatively, the inverse noise image may be averaged with or otherwise combined with the previous values in the offset table, to produce an updated correction table.

In method 27" of FIG. 5, integrator 58 is adjustable by means of constant block 62, which may be adjusted to either slow or quicken the responsiveness of the integrator to changes in detector non-uniformity noise image 56. Thus, in applications where detector non-uniformity is expected to evolve rapidly over time, constant block 62 may be adjusted to rapidly update offset correction table 32 in response, while in applications where stability is expected, constant block 62 may be adjusted to slowly update offset correction table 32. In any event, the updated offset table is then applied to the next image signal, and the partially corrected image proceeds through a bilateral filter just as in methods 27 and 27'. Following bilateral filtering, translation effects (if any) of dithering mechanism 18 may be removed from filtered image 50 by means of demodulator 36. Demodulator 36 stores each filtered image 50 in a frame buffer, where a signal is applied to remove translation effects of dithering mechanism 18 when dithering is employed. Thus, the image 38 presented to the user appears stable and free of system-induced motion.

V. Other Embodiments

The present disclosure contemplates methods and apparatus suitable for applying a bilateral filter 34 and/or a demodulator 36 with or without the adaptable threshold depicted in FIG. 4, and with or without the iteratively adjusted offset table depicted in FIG. 5. The disclosure set forth above may encompass multiple distinct inventions with independent utility. The disclosure relates information regarding specific embodiments, which are included for illustrative purposes, and which are not to be considered in a limiting sense, because numerous variations are possible. The inventive subject matter of the disclosure includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A non-uniformity error correction system, comprising:
a plurality of detectors disposed substantially within a planar array, the detectors configured to receive changing image data and to produce sequential image signals in response, each image signal corresponding to one respective pixel in an overall image; and
a processor configured to receive the image signals produced by the detectors and to apply a bilateral filter to the signals, the bilateral filter being a function of both a spatial separation and a photometric separation between each pixel and each one of an associated neighborhood of pixels;
wherein the bilateral filter is configured to at least partially correct the image signals for non-uniformity errors among the detectors; and
wherein the associated neighborhood of pixels excludes pixels having a photometric separation greater than a threshold value.

2. The system of claim 1, wherein the photometric separation between pixels is a function of a difference in intensity between the pixels.

3. The system of claim 1, wherein the photometric separation between pixels is a function of a difference in color between the pixels.

4. The system of claim 1, wherein the bilateral filter is defined using the product of a first weight factor that depends on spatial separation between pixels and a second weight factor that depends on photometric separation between the pixels.

5. The system of claim 4, wherein the first weight factor is a Gaussian function of spatial separation characterized by a first width parameter, and the second weight factor is a Gaussian function of photometric separation characterized by a second width parameter.

6. The system of claim 5, wherein the second weight factor is a Gaussian function of intensity difference.

7. The system of claim 1, further comprising a dithering mechanism configured to spatially translate incoming image data such that detector non-uniformity error frequency is lower than scene information frequency and temporal noise frequency;
wherein the processor is further configured to remove the lower frequency detector non-uniformity errors from the signals and to iteratively update detector offset correction data based on non-uniformity errors removed by processor.

8. The system of claim 7, wherein the incoming image data substantially changes more than once per second, and the dithering mechanism is further configured to spatially translate the incoming image data with a frequency of less than one cycle per second.

9. The system of claim 1, wherein the processor is further configured to detect scene motion and to iteratively update detector offset correction data based on non-uniformity errors removed by the bilateral filter when sufficient scene motion is detected.

10. A method of correcting focal plane array non-uniformity errors, comprising:
receiving changing image data at a substantially planar array of detectors;
producing image signals with the array of detectors in response to the received image data, each image signal corresponding to one respective pixel in an overall image;
applying a bilateral filter to the image signals produced by the detectors to at least partially correct the signals for non-uniformity errors among the detectors, the bilateral filter being a function of both a spatial separation and a photometric separation between each pixel and each one of an associated neighborhood of pixels; and excluding from the associated neighborhood of pixels those pixels having a photometric separation greater than a threshold value.

11. The method of claim 10, wherein the bilateral filter is defined using the product of a first weight factor that depends on spatial separation between pixels and a second weight factor that depends on photometric separation between the pixels.

12. The method of claim 11, wherein the first weight factor is a Gaussian function of spatial separation characterized by a first width parameter, and the second weight factor is a Gaussian function of photometric separation characterized by a second width parameter.

13. The method of claim 12, wherein the second weight factor is a Gaussian function of intensity difference.

14. The method of claim 10, further comprising iteratively updating detector offset correction data based on non-uniformity errors corrected by the bilateral filter.

15. The method of claim 14, further comprising spatially translating the data prior to receiving the image data at the array of detectors.

16. The method of claim 15, wherein spatially translating the data occurs at a first frequency less than one cycle per second, and the image data changes at a second frequency greater than one cycle per second.

17. The method of claim 14, further comprising detecting scene motion by comparing a captured image frame with a reference frame, and iteratively updating the detector offset correction data only if scene motion exceeds a predetermined amount.

18. A non-uniformity error correction system, comprising:
a dithering mechanism configured to spatially translate image data on a focal plane array of infrared radiation detectors; and
a processor configured to receive image signals produced by the array of detectors, to at least partially correct the image signals for non-uniformity errors among the detectors by applying a bilateral filter to the signals, and to remove translation effects of the dithering mechanism from the signals;
wherein the bilateral filter is defined using the mathematical product of a function of spatial separation between the image signals and a function of photometric separation between the image signals, and wherein the bilateral filter does not consider image signals having a photometric separation greater than a threshold value.

19. The system of claim 1, wherein the processor is configured to automatically adapt the threshold value in response to a change in image conditions over time.

20. The system of claim 19, wherein the processor is configured to adapt the threshold value in response to a change in a non-uniformity correction metric, the non-uniformity correction metric corresponding to an amount of non-uniformity error correction by the system.

21. The system of claim 19, wherein adapting the threshold includes lowering the threshold value in response to an increase in an amount of non-uniformity error correction.

22. The system of claim 1, wherein the threshold value is a first threshold value, and the associated neighborhood of pixels further excludes pixels having a spatial separation greater than a second threshold value.

23. The system of claim 22, wherein the processor is configured to automatically adapt the second threshold value by raising the second threshold value in response to an increase in an amount of non-uniformity error correction.

24. The method of claim 10, further including adapting the threshold value in response to a change in image conditions over time.

25. The method of claim 24, wherein adapting the threshold value includes lowering the threshold value in response to an increase in an amount of non-uniformity error correction.

26. The method of claim 10, wherein the threshold value is a first threshold value, and the method further includes:
excluding from the associated neighborhood of pixels those pixels having a spatial separation greater than a second threshold value; and
automatically adapting the second threshold value by raising the second threshold value in response to an increase in an amount of non-uniformity error correction.

* * * * *